United States Patent
Kishikawa et al.

(10) Patent No.: US 11,282,156 B2
(45) Date of Patent: Mar. 22, 2022

(54) TRANSPORTATION PLANNING APPARATUS, TRANSPORTATION PLANNING SYSTEM, AND TRANSPORTATION PLANNING METHOD

(71) Applicant: Hitachi, Ltd., Tokyo (JP)

(72) Inventors: Naoko Kishikawa, Tokyo (JP); Junko Hosoda, Tokyo (JP); Futoshi Koike, Tokyo (JP)

(73) Assignee: HITACHI, LTD., Tokyo (JP)

( * ) Notice: Subject to any disclaimer, the term of this patent is extended or adjusted under 35 U.S.C. 154(b) by 56 days.

(21) Appl. No.: 16/844,086

(22) Filed: Apr. 9, 2020

(65) Prior Publication Data

US 2020/0342560 A1  Oct. 29, 2020

(30) Foreign Application Priority Data

Apr. 24, 2019  (JP) .............................. JP2019-082478

(51) Int. Cl.
*G06Q 50/28* (2012.01)
*G06Q 10/10* (2012.01)

(52) U.S. Cl.
CPC ......... *G06Q 50/28* (2013.01); *G06Q 10/1097* (2013.01)

(58) Field of Classification Search
CPC .......................... G06Q 50/28; G06Q 10/1097
USPC ........................................................ 705/337
See application file for complete search history.

(56) References Cited

U.S. PATENT DOCUMENTS

| | | | | |
|---|---|---|---|---|
| 10,007,889 B2 * | 6/2018 | Arunapuram | ........ | G06Q 10/047 |
| 10,997,545 B1 * | 5/2021 | Bhagwat | ............... | H04W 4/029 |
| 2004/0010428 A1 * | 1/2004 | Lee | ........ | G06Q 10/08 |
| | | | | 705/6 |
| 2004/0044469 A1 * | 3/2004 | Bender | ........ | G09B 29/00 |
| | | | | 701/532 |
| 2007/0038506 A1 * | 2/2007 | Noble | ........ | G06Q 10/08 |
| | | | | 705/13 |
| 2010/0185476 A1 * | 7/2010 | Eager | ........ | G06Q 10/063 |
| | | | | 705/7.11 |

(Continued)

FOREIGN PATENT DOCUMENTS

JP   2018-106621 A   7/2018

OTHER PUBLICATIONS

"Optimal multiple delivery schedule for demand in logistic model" by Shuo-Yan Chou (Year: 2001).*

*Primary Examiner* — Zeina Elchanti
(74) *Attorney, Agent, or Firm* — Mattingly & Malur, PC

(57) ABSTRACT

A transportation planning apparatus calculates work time included in a transportation work plan. The transportation planning apparatus holds (i) order information showing a plurality of orders each including a delivery work and a pickup work, a site where the delivery work is performed, and a site where the pickup work is performed, and (ii) work time information of the delivery work, the pickup work, and a delivery and pickup work when regarded as one work. A transportation work order plan is generated showing a performing order of the delivery work and the pickup work that are included in the plurality of orders, sets the delivery work and the pickup work that are continuous at the same site, and specifies work time of the delivery work, the pickup work, and the delivery and pickup work that are included in the transportation work order plan with reference to the work time information.

8 Claims, 11 Drawing Sheets

(56) References Cited

U.S. PATENT DOCUMENTS

| | | | |
|---|---|---|---|
| 2011/0087612 A1* | 4/2011 | Yuasa | G06Q 10/08 |
| | | | 705/332 |
| 2011/0161241 A1* | 6/2011 | Jani | G06Q 10/08345 |
| | | | 705/338 |
| 2012/0233085 A1* | 9/2012 | Zimberoff | G06Q 30/0635 |
| | | | 705/330 |
| 2014/0180955 A1* | 6/2014 | Podgurny | G06F 3/04847 |
| | | | 705/335 |
| 2015/0347959 A1* | 12/2015 | Skaaksrud | H04B 17/3913 |
| | | | 705/333 |
| 2017/0132532 A1* | 5/2017 | Myers | G06Q 10/0833 |
| 2018/0150797 A1* | 5/2018 | Coyle | G06Q 50/28 |
| 2020/0342560 A1* | 10/2020 | Kishikawa | G06Q 50/28 |

* cited by examiner

[FIG. 1]
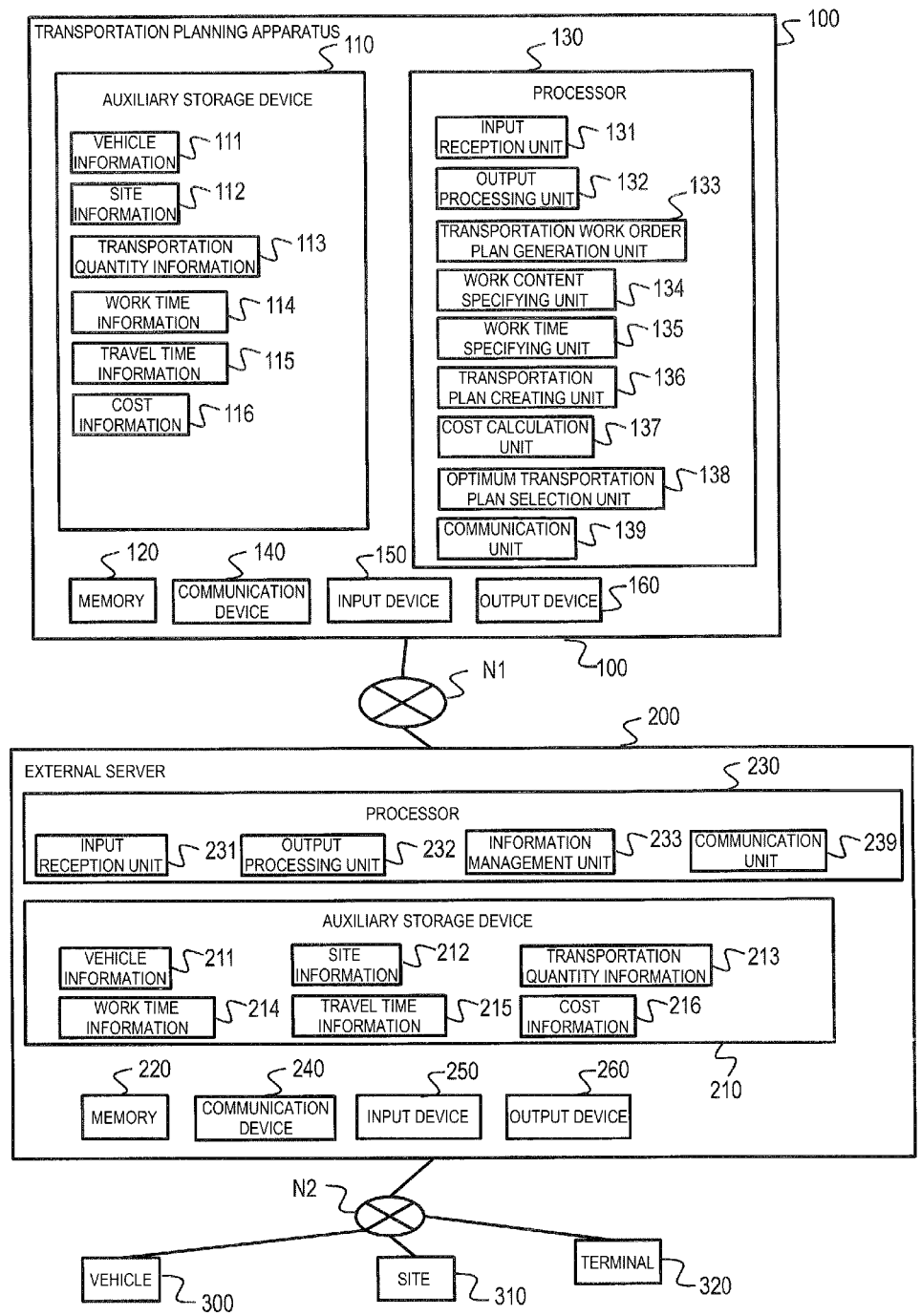

[FIG. 2]

VEHICLE INFORMATION

| VEHICLE NAME | LOAD QUANTITY UPPER LIMIT [PALLET] | VEHICLE TYPE | OPERABLE PERIOD |
|---|---|---|---|
| VEHICLE 1 | 30 | REFRIGERATING | 5:00~14:00 |
| VEHICLE 2 | 100 | ROOM TEMPERATURE | 6:00~15:00 |
| VEHICLE 3 | 100 | ROOM TEMPERATURE | 8:00~17:00 |

[FIG. 3]

SITE INFORMATION

| SITE NAME | ADDRESS |
|---|---|
| LOGISTICS CENTER A | B DISTRICT, A CITY |
| STORE 1 | D DISTRICT, C CITY |
| CUSTOMER 2 | F DISTRICT, E CITY |

[FIG. 4]

TRANSPORTATION QUANTITY INFORMATION

| 113a | 113b | 113c | 113d | 113e | | 113f | | 113g |
|---|---|---|---|---|---|---|---|---|
| PURCHASE ORDER ID | TRANSPORTATION QUANTITY [PALLET] | PICKUP SITE NAME | DELIVERY SITE NAME | AVAILABLE PICKUP PERIOD | | DELIVERABLE PERIOD | | VEHICLE TYPE |
| | | | | STARTING TIME POINT | ENDING TIME POINT | STARTING TIME POINT | ENDING TIME POINT | |
| 1 | 30 | LOGISTICS CENTER A | STORE 1 | 12/3 8:00 | 12/3 17:00 | 12/3 8:00 | 12/3 9:30 | REFRIGERATING |
| 2 | 5 | STORE 1 | CUSTOMER 2 | 12/3 8:00 | 12/3 17:00 | 12/3 9:45 | 12/3 12:00 | REFRIGERATING, ROOM TEMPERATURE |
| 3 | 24 | STORE 1 | LOGISTICS CENTER A | 12/3 8:00 | 12/3 15:00 | 12/3 8:00 | 12/3 17:00 | REFRIGERATING, ROOM TEMPERATURE |

[FIG. 5]

WORK TIME INFORMATION

| SITE NAME (114a) | VEHICLE TYPE (114b) | WORK CONTENT (114c) | WORK TIME [MINUTE] (114d) |
|---|---|---|---|
| LOGISTICS CENTER A | REFRIGERATING | DELIVERY | 14 |
| LOGISTICS CENTER A | REFRIGERATING | PICKUP | 8 |
| LOGISTICS CENTER A | REFRIGERATING | DELIVERY AND COLLECTION | 30 |
| LOGISTICS CENTER A | ROOM TEMPERATURE | DELIVERY | 12 |
| LOGISTICS CENTER A | ROOM TEMPERATURE | PICKUP | 6 |
| LOGISTICS CENTER A | ROOM TEMPERATURE | DELIVERY AND PICKUP | 26 |
| STORE 1 | REFRIGERATING | DELIVERY | 20 |
| STORE 1 | REFRIGERATING | PICKUP | 12 |
| STORE 1 | REFRIGERATING | DELIVERY AND PICKUP | 40 |
| STORE 1 | ROOM TEMPERATURE | DELIVERY | 18 |
| STORE 1 | ROOM TEMPERATURE | PICKUP | 10 |
| STORE 1 | ROOM TEMPERATURE | DELIVERY AND PICKUP | 35 |
| CUSTOMER 2 | REFRIGERATING | DELIVERY | 5 |
| CUSTOMER 2 | REFRIGERATING | PICKUP | 10 |
| CUSTOMER 2 | REFRIGERATING | DELIVERY AND PICKUP | 18 |
| CUSTOMER 2 | ROOM TEMPERATURE | DELIVERY | 4 |
| CUSTOMER 2 | ROOM TEMPERATURE | PICKUP | 8 |
| CUSTOMER 2 | ROOM TEMPERATURE | DELIVERY AND PICKUP | 16 |

[FIG. 6]

TRAVEL TIME INFORMATION

| DEPARTURE SITE NAME (115a) | ARRIVAL SITE NAME (115b) | TRAVEL TIME (MINUTE) (115c) |
|---|---|---|
| LOGISTICS CENTER A | LOGISTICS CENTER A | 0 |
| LOGISTICS CENTER A | STORE 1 | 24 |
| LOGISTICS CENTER A | CUSTOMER 2 | 10 |
| STORE 1 | LOGISTICS CENTER A | 34 |
| STORE 1 | STORE 1 | 0 |
| STORE 1 | CUSTOMER 2 | 18 |

[FIG. 7]

COST INFORMATION

| VEHICLE NAME (116a) | FIXED COST [$/MONTH] (116b) | VARIABLE COST [$/HOUR] (116c) |
|---|---|---|
| VEHICLE 1 | 30,000 | 5 |
| VEHICLE 2 | 40,000 | 6 |

[FIG. 8]
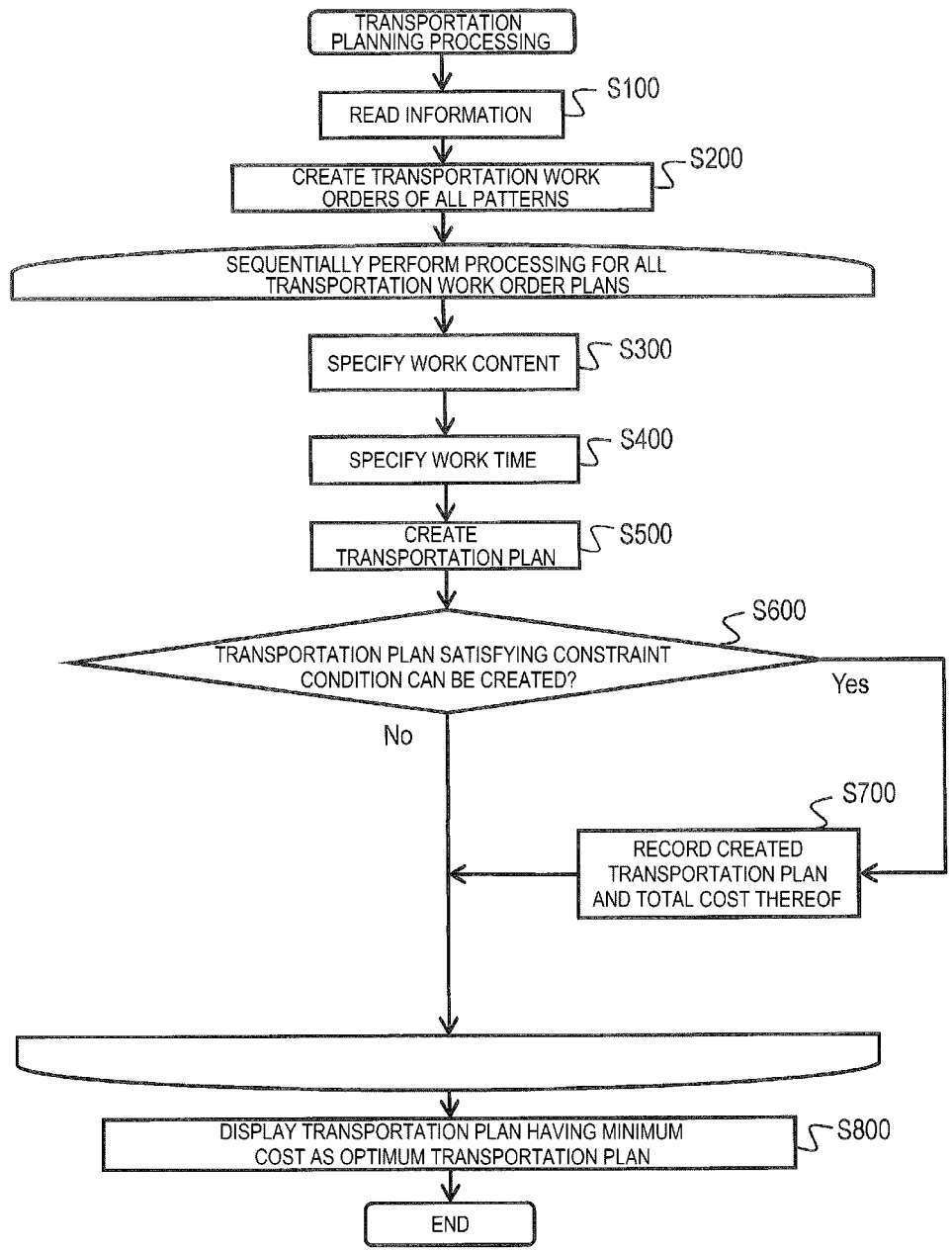

[FIG. 9]
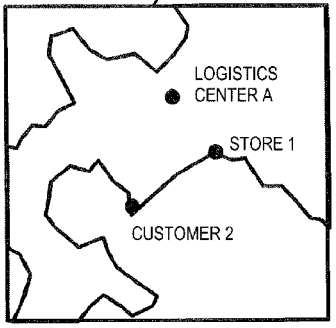

[FIG. 10]
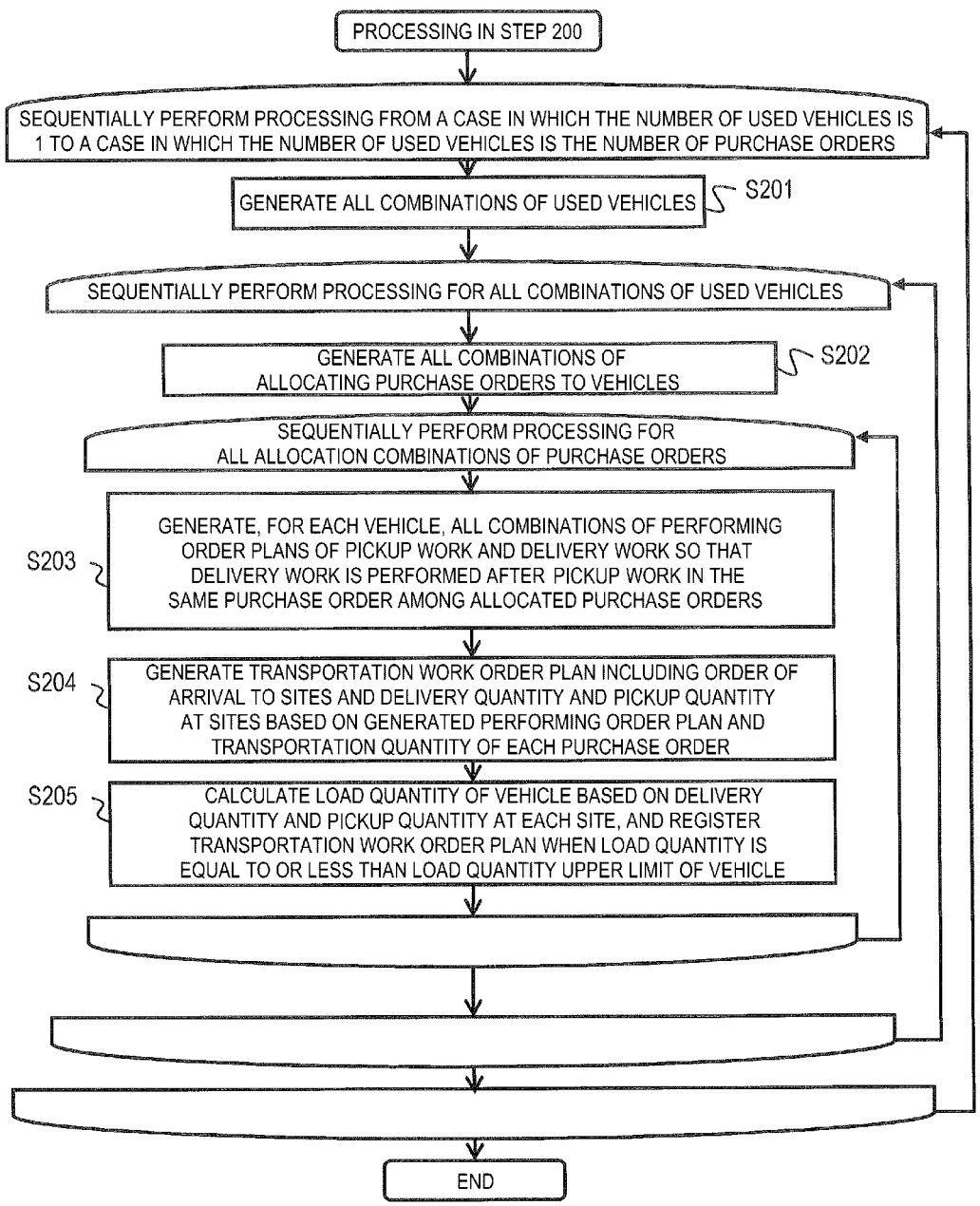

[FIG. 11]
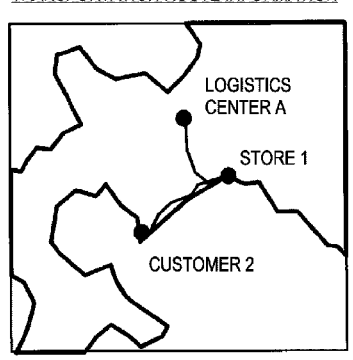

[FIG. 12]
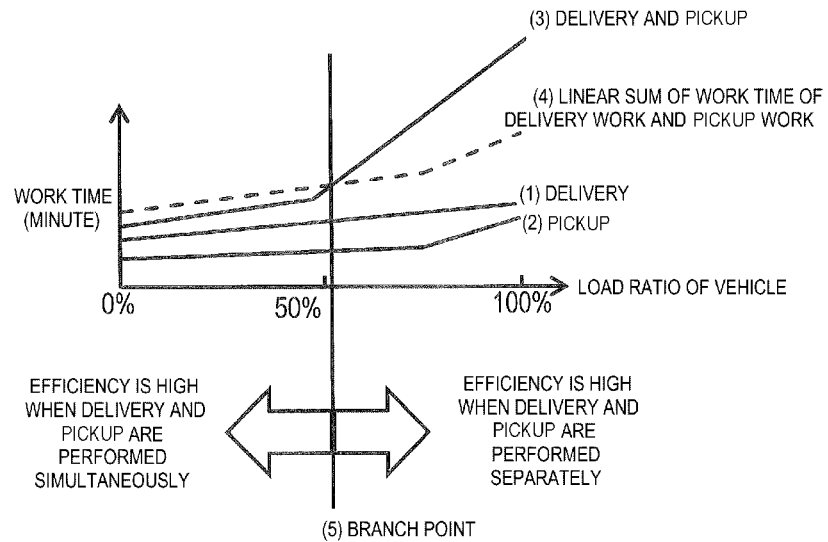
[FIG. 13]
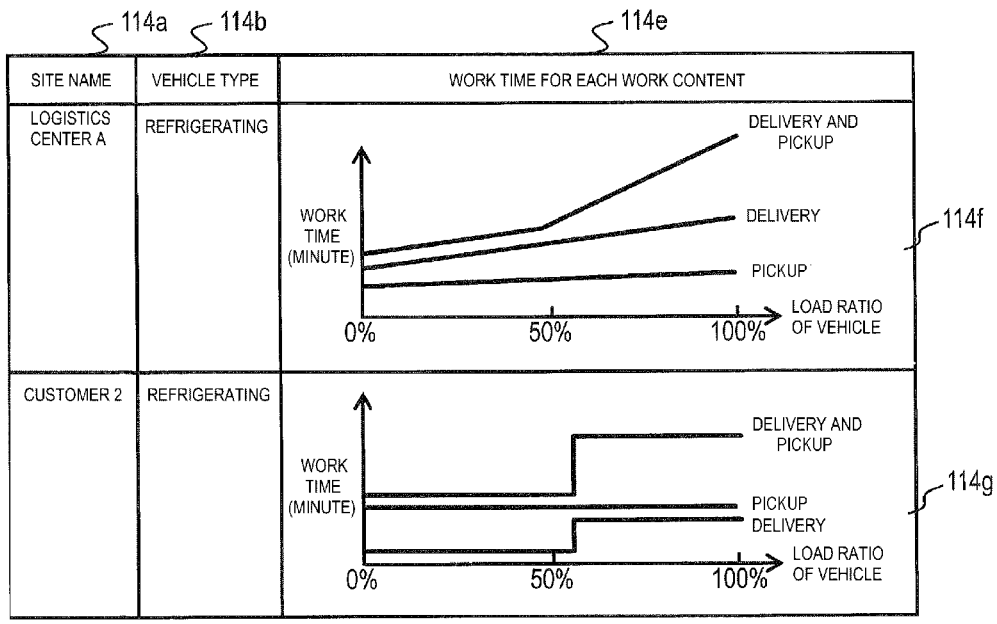

[FIG. 14]
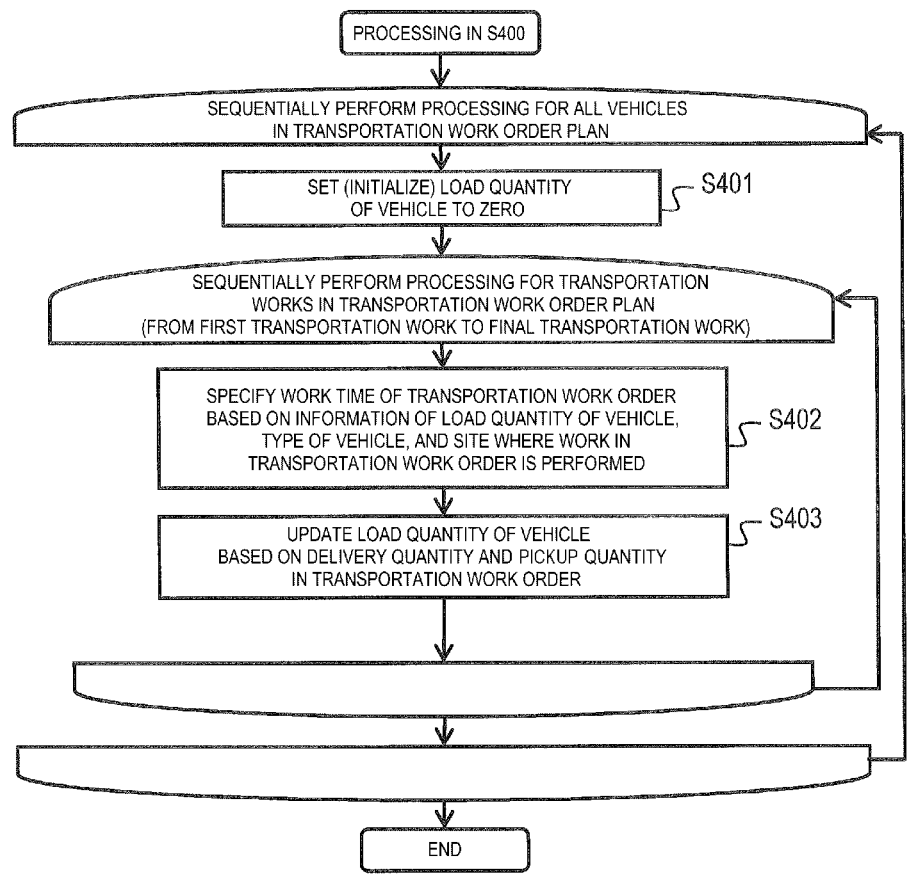

TRANSPORTATION PLANNING APPARATUS, TRANSPORTATION PLANNING SYSTEM, AND TRANSPORTATION PLANNING METHOD

CLAIM OF PRIORITY

The present application claims priority from Japanese patent application JP 2019-082478 filed on Apr. 24, 2019, the content of which is hereby incorporated by reference into this application.

TECHNICAL FIELD

The present invention relates to a transportation planning apparatus, a transportation planning system, and a transportation planning method.

BACKGROUND ART

JP-A-2018-106621 (Patent Literature 1) is a related art in the present technical field. Patent Literature 1 discloses that "a vessel allocation plan creating apparatus 3 sets restrictions as a restriction of consideration of navigation days and loading time upon moving from a certain point to another point, a restriction of consideration of a possible amount of loading of a vessel, and a restriction of determination of loading contents and discharging contents for the vessel with satisfying demands of each region, sets at least demurrage fee as an evaluation function, represents these restrictions and the evaluation function in the form of equations, creates an optimization model which minimizes the evaluation function, and creates a vessel allocation plan by solving the optimization model by a mathematical optimization method based on the restrictions" (see abstract).

CITATION LIST

Patent Literature

PTL 1: JP-A-2018-106621

SUMMARY OF INVENTION

Technical Problem

The technique disclosed in Patent Literature 1 does not consider different work time required for (1) a delivery work of transporting goods from a vehicle such as a ship, a truck, or a train to a site such as a port, a logistics site, a store, or a customer, (2) a pickup work of transporting picked-up goods from a site to a vehicle, and (3) a delivery and pickup work of simultaneously transporting goods from a vehicle to a site and transporting picked-up goods from a site to the vehicle.

A transshipment work is performed in the delivery and pickup work to arrange goods to be transported to a subsequent site nearby while carrying picked-up goods in. Therefore, work time for the delivery and pickup work is different from a simple linear sum of the delivery work and the pickup work (for example, the linear sum is small). However, the technique disclosed in Patent Literature 1 does not take this into consideration. Therefore, a work may not be completed within work time indicated by a work plan created according to the technique disclosed in Patent Literature 1. Therefore, according to an aspect of the invention, an object is to more accurately calculate work time included in a transportation work plan.

Solution to Problem

In order to solve the above problems, the following configurations are adopted according to an aspect of the invention. A transportation planning apparatus includes a processor and a memory. The memory holds (i) order information showing a plurality of orders each including a delivery work and a pickup work, a site where the delivery work included in each of the plurality of orders is performed, and a site where the pickup work included in each of the plurality of orders is performed, and (ii) work time information showing respective work time of the delivery work, the pickup work, and a delivery and pickup work in which the delivery work and the pickup work are regarded as one work. The processor generates one or more transportation work order plans each showing a performing order of the delivery work and the pickup work that are included in the plurality of orders, and sets the delivery work and the pickup work that are continuous at the same site as the delivery and pickup work in each of the one or more transportation work order plans. The processor specifies work time for the delivery work, the pickup work, and the delivery and pickup work that are included in each of the one or more transportation work order plans with reference to the work time information, and includes the specified work time in work time of each of the transportation work order plans.

Advantageous Effect

According to the aspect of the invention, work time included in a transportation work plan can be calculated more accurately. Problems, configurations, and effects other than those described above will become apparent from the following description of embodiments.

BRIEF DESCRIPTION OF DRAWINGS

FIG. 1 is a block diagram showing a configuration example of a transportation planning system according to a first embodiment.

FIG. 2 shows an example of vehicle information according to the first embodiment.

FIG. 3 shows an example of site information according to the first embodiment.

FIG. 4 shows an example of transportation quantity information according to the first embodiment.

FIG. 5 shows an example of work time information according to the first embodiment.

FIG. 6 shows an example of travel time information according to the first embodiment.

FIG. 7 shows an example of cost information according to the first embodiment.

FIG. 8 is a flowchart showing an example of a transportation planning processing according to the first embodiment.

FIG. 9 shows an example of a display screen displaying input information according to the first embodiment.

FIG. 10 is a flowchart showing an example of a processing of generating transportation work order plans of all patterns according to the first embodiment.

FIG. 11 shows an example of a display screen showing a transportation plan having a minimum cost according to the first embodiment.

FIG. 12 shows an example of a graph showing a relationship between a load ratio and work time of a vehicle for each work content according to the first embodiment.

FIG. 13 shows an example of work time information according to a second embodiment.

FIG. 14 is a flowchart showing a detailed example of a work time specifying processing according to the second embodiment.

DESCRIPTION OF EMBODIMENTS

Hereinafter, embodiments of the invention will be described in detail with reference to the drawings. In the present embodiments, the same components are denoted by the same reference numerals in principle and a repetitive description thereof will be omitted. It should be noted that the embodiments are merely an example for implementing the invention and do not limit the technical scope of the invention.

First Embodiment

FIG. 1 is a block diagram showing a configuration example of a transportation planning system according to the present embodiment. The transportation planning system includes, for example, a transportation planning apparatus 100 and an external server 200. The transportation planning apparatus 100 and the external server 200 are communicably connected via a network N1. Examples of the network N1 and a network N2 which will be described later include a public network such as the Internet, a local area network (LAN), and a wide area network (WAN).

The transportation planning apparatus 100 creates an executable and efficient transportation plan by determining a work content to be performed at a site such as a store from three kinds of works including (1) a delivery work, (2) a pickup work, and (3) a delivery and pickup work and appropriately determining a total work time of the three kinds of works using a method that is not simply a linear sum. The transportation planning apparatus 100 is implemented by a computer including an auxiliary storage device 110, a memory 120, a processor 130, a communication device 140, an input device 150, an output device 160, and the like.

The processor 130 is, for example, a central processing unit (CPU) and executes a program stored in the memory 120. The memory 120 includes a read only memory (ROM) which is a non-volatile storage element and a random access memory (RAM) which is a volatile storage element.

The ROM stores an invariable program (for example, a BIOS). The RAM is a high-speed and volatile storage element such as a dynamic random access memory (DRAM) and temporarily stores a program to be executed by the processor 130 and data used when the program is executed.

The auxiliary storage device 110 is a large-capacity and nonvolatile storage device such as a magnetic storage device (HDD) and a flash memory (SSD) and stores a program to be executed by the processor 130 and data used when the program is executed. That is, the program is read from the auxiliary storage device 110, loaded into the memory 120, and executed by the processor 130.

The communication device 140 is a network interface device that controls communication among other devices in accordance with a predetermined protocol. The communication device 140 may perform wired communication via a network cable or the like, or may perform wireless communication via an antenna or the like.

The input device 150 is a device that receives an input from an operator. An example of the input device 150 includes a pointing device such as a keyboard, a mouse, and a touch panel. The output device 160 is a device that outputs an execution result of a program in a format that can be visually recognized by the operator. Examples of the output device 160 include a printer and a display device such as a liquid crystal display and an organic display.

The program executed by the processor 130 is provided to the transportation planning apparatus 100 via a removable medium (such as a CD-ROM and a flash memory) or a network and is stored in the nonvolatile auxiliary storage device 110 which is a non-transitory storage medium. Therefore, the transportation planning apparatus 100 may include an interface for reading data from the removable medium.

The processor 130 includes an input reception unit 131, an output processing unit 132, a transportation work order plan generation unit 133, a work content specifying unit 134, a work time specifying unit 135, a transportation plan creating unit 136, a cost calculation unit 137, an optimum transportation plan selection unit 138, and a communication unit 139.

For example, the processor 130 functions as the input reception unit 131 by being operated in accordance with an input reception program loaded into the memory 120. The processor 130 functions as the output processing unit 132 by being operated in accordance with an output processing unit program loaded into the memory 120. The same applies to a relationship between programs and other units included in the processor 130. The same applies to a relationship between a processor and a program in another apparatus included in a transportation planning system.

The input reception unit 131 receives information input into the input device 150. The input reception unit 131 acquires information stored in the auxiliary storage device 110 or the memory 120. The output processing unit 132 generates screen information to be output to the output device 160.

The transportation work order plan generation unit 133 performs a processing of generating a transportation work order plan. Specifically, for example, the transportation work order plan generation unit 133 generates one or more transportation work order plans including an arriving order of each vehicle to a site and a delivery quantity and a pickup quantity at the site.

The work content specifying unit 134 specifies a work content at each site. Specifically, for example, the work content specifying unit 134 specifies a work content at each site from any one of (1) a delivery work, (2) a pickup work, and (3) a delivery and pickup work based on a delivery quantity and a pickup quantity at each site in a transportation work order plan generated by the transportation work order plan generation unit 133.

The work time specifying unit 135 specifies work time at each site. Specifically, for example, the work time specifying unit 135 specifies work time based on the work content specified by the work content specifying unit 134. The transportation plan creating unit 136 creates a transportation plan. Specifically, for example, the transportation plan creating unit 136 creates a transportation plan using the work time specified by the work time specifying unit 135.

The cost calculation unit 137 calculates a total cost of the created transportation plan. The optimum transportation plan selection unit 138 selects an optimum transportation plan (for example, a transportation plan having a minimum total cost) based on the total cost calculated by the cost calculation unit 137, and displays information about the optimum transportation plan via the output processing unit 132. The communication unit 139 communicates with an external device of the transportation planning apparatus 100 by using the communication device 140 to transmit and receive information.

The auxiliary storage device 110 holds vehicle information 111, site information 112, transportation quantity information 113, work time information 114, travel time information 115, cost information 116, and the like. Some or all pieces of information stored in the auxiliary storage device 110 may be stored in the memory 120, or may be stored in an external database or the like connected to the transportation planning apparatus 100.

The vehicle information 111 shows a vehicle available for transporting goods. The vehicle includes various transportation machines such as a truck, a ship, and a train. Although the present embodiment describes an example in which transportation is performed by a vehicle, transportation may be performed by a transportation machine other than the vehicle (such as an aircraft, a vessel, and/or a deliveryman (human power)). In this case, the vehicle information 111 also holds information about these transportation machines.

The site information 112 shows a site such as a logistics site, a store, a customer, and a port. The transportation quantity information 113 shows a transportation quantity, a pickup site, and a delivery site for each purchase order. That is, the transportation quantity information 113 includes purchase order information. The work time information 114 shows work time for each combination of a site and a work content ((1) a delivery work, (2) a pickup work, and (3) a delivery and pickup work). The travel time information 115 shows travel time required to travel between sites. The cost information 116 shows a cost of a vehicle.

The external server 200 manages, for example, information required to generate a transportation plan by the transportation planning apparatus 100, and provides the information to the transportation planning apparatus 100. The external server 200 is connected to a vehicle 300, a site 310, a terminal 320, or the like via the network N2. The external server 200 is implemented by a computer including an auxiliary storage device 210, a memory 220, a processor 230, a communication device 240, an input device 250, an output device 260, and the like.

Since hardware of the auxiliary storage device 210, the memory 220, the processor 230, the communication device 240, the input device 250, and the output device 260 is respectively the same as hardware of the auxiliary storage device 110, the memory 120, the processor 130, the communication device 140, the input device 150, and the output device 160, a description thereof will be omitted.

The processor 230 includes an input reception unit 231, an output processing unit 232, an information management unit 233, and a communication unit 239. The input reception unit 231 receives information input into the input device 250. The input reception unit 231 acquires information stored in the auxiliary storage device 210 or the memory 220. The output processing unit 232 generates screen information to be output to the output device 260. The communication unit 239 communicates with an external device of the external server 200 by using the communication device 240 to transmit and receive information.

The information management unit 233 manages various types of information stored in the auxiliary storage device 210. For example, the information management unit 233 updates information stored in the auxiliary storage device 210 based on information acquired from the vehicle 300, the site 310, the terminal 320, and the like by the communication unit 239, or information received by the input reception unit 231. The information management unit 233 transmits various types of information stored in the auxiliary storage device 210 to the transportation planning apparatus 100 via the communication unit 239 in response to, for example, a request from the transportation planning apparatus 100 or on a regular basis.

The auxiliary storage device 210 holds vehicle information 211, site information 212, transportation quantity information 213, work time information 214, travel time information 215, and cost information 216. A description of the vehicle information 211, the site information 212, the transportation quantity information 213, the work time information 214, the travel time information 215, and the cost information 216 is respectively the same as a description of the vehicle information 111, the site information 112, and the transportation quantity information 113, the work time information 114, the travel time information 115, and the cost information 116, and therefore will be omitted.

The transportation planning apparatus 100 may be directly connected with the vehicle 300, the site 310, and the terminal 320, and may update the information stored in the auxiliary storage device 110 without based on information received from the external server 200 by the transportation planning apparatus 100.

In the present embodiment, information used by the transportation planning system may be represented by any data structure and independent of the data structure. For example, a data structure appropriately selected from a table, a list, a database, or a queue can store information. In an example which will be described later, each piece of data held by the auxiliary storage device 110 is represented by a table structure.

Each apparatus provided in the transportation planning system is a computer system implemented by a single physical computer or by a plurality of logical or physical computers. Each apparatus maybe operated by a separate thread on the same computer, or by a virtual computer constructed on a plurality of physical computer resources.

FIG. 2 shows an example of the vehicle information 111. The vehicle information 111 includes a vehicle name column 111a, a load quantity upper limit column 111b, and the like. The vehicle information 111 may further include a vehicle type column 111c. The vehicle information 111 may further include an operable period column 111d.

The vehicle name column 111a holds information for identifying a vehicle. A vehicle name may be a name of the vehicle or an ID or the like for identifying the vehicle. The load quantity upper limit column 111b holds information showing an upper limit of a load quantity of the vehicle. A unit of values held in the load quantity upper limit column 111b can be set to any unit such as pallet, number, lot, and cubic meter.

The vehicle type column 111c holds information defining a type of the vehicle. Specifically, the vehicle type column 111c holds information showing a vehicle capacity, for example, a temperature zone in a vehicle storage such as refrigerating or room temperature, a size of the vehicle such as a 2t truck or a 4t truck, a transportable area such as west of Japan or east of Japan, and/or whether dangerous goods can be loaded.

FIG. 3 shows an example of the site information 112. The site information 112 includes a site name column 112a, or the like. The site information 112 may further include an address column 112b. The site name column 112a holds information showing a name of a site where (1) a delivery work, (2) a pickup work, or (3) a delivery and pickup work is performed. A site name may be, for example, an ID for identifying a site, or may be a name of a port, a location, a customer, or the like. The address column 112b holds information showing a location (for example, an address) of a site.

FIG. 4 shows an example of the transportation quantity information 113. In the present embodiment, one purchase order includes a pickup work at one pickup site and a delivery work at one delivery site. Therefore, transportation involving a plurality of pickup sites and a plurality of delivery sites is defined by a plurality of purchase orders.

The transportation quantity information 113 includes a purchase order ID column 113a, a transportation quantity column 113b, a pickup site name column 113c, a delivery site name column 113d, an available pickup period column 113e, a deliverable period column 113f, and the like. The transportation quantity information 113 may further include a vehicle type column 113g.

The purchase order ID column 113a stores information showing an ID of a purchase order. The transportation quantity column 113b holds information showing a transportation quantity of a corresponding purchase order from a pickup site to a delivery site. A unit of values held in the transportation quantity column 113b can be set to any unit such as pallet, number, lot, and cubic meter.

The pickup site name column 113c holds information showing a name of a pickup site. The delivery site name column 113d holds information showing a name of a delivery site. The available pickup period column 113e holds information showing a period when a pickup work of a purchase order can be performed at a pickup site. The available pickup period is defined by, for example, a starting time point and an ending time point.

The deliverable period column 113f holds information showing a period when a delivery work of a corresponding purchase order can be performed at a delivery site. The deliverable period is defined by, for example, a starting time point and an ending time point. The available pickup period column 113e and the deliverable period column 113f may hold information showing a time point only, or may hold information showing a date or a day of a week in addition to the time point.

The vehicle type column 113g holds information showing a type of a vehicle that can transport goods of a corresponding purchase order. For example, the vehicle type column 113g holds information showing a refrigerator car for a purchase order to transport refrigerated goods, and information showing a refrigerator car and a room temperature car for a purchase order to transport empty pallets picked-up from a store and room temperature goods.

FIG. 5 shows an example of the work time information 114. Specifically, the work time information 114 includes a site name column 114a, a vehicle type column 114b, a work content column 114c, a work time column 114d, and the like.

The site name column 114a holds information showing a name of a site. For example, a distance from a parking lot to a delivery site or a pickup site is short in a small store, but long in a large shopping mall. That is, work time of transportation from a parking lot to a delivery site or a pickup site is longer for a large shopping mall than for a small store. Therefore, work time is calculated more accurately by defining work time on a site basis in such a manner.

Similar to the vehicle type column 111c, the vehicle type column 114b holds information defining a type of a vehicle. For example, when a work is performed while a rear door of a refrigerator car is opened, temperature in the refrigerator rises and goods may go bad. However, goods do not go bad even when a work is performed while a rear door of a room temperature car is opened. That is, work time for a refrigerator car whose number of times of opening and closing the rear door is large is longer than work time for a room temperature car. Therefore, work time is calculated more accurately by defining work time on a vehicle type basis in such a manner.

The work content column 114c holds information showing anyone of (1) a delivery work, (2) a pickup work, (3) a delivery and pickup work, and the like. The work time column 114d holds information showing work time required for a work shown in the record. A unit of values in the work time column 114d can be set to any unit such as second, minute, or hour.

FIG. 6 shows an example of the travel time information 115. Specifically, the travel time information 115 includes a departure site name column 115a, an arrival site name column 115b, a travel time column 115c, and the like. The departure site name column 115a holds information showing a name of a departure site. The arrival site name column 115b holds information showing a name of an arrival site.

The travel time column 115c holds information showing travel time required for traveling from a departure site to an arrival site. A unit of values in the travel time column 115c can be set to any unit such as minute and hour. In the travel time information 115, the travel time between sites may be defined on a transportation machine basis or a vehicle type basis.

FIG. 7 shows an example of the cost information 116. Specifically, the cost information 116 includes a vehicle name column 116a, a fixed cost column 116b, a variable cost column 116c, and the like. The vehicle name column 116a holds information showing a name of a vehicle. The fixed cost column 116b holds information showing a fixed cost required when a vehicle is used. The variable cost column 116c holds information showing a variable cost added corresponding to operation time or a work quantity when the vehicle is used.

A unit of period and currency of the fixed cost held in the fixed cost column 116b and the variable cost held in the variable cost column 116c can be set to any unit such as $/month and yen/year. In addition, the fixed cost and the variable cost may be set to different values depending on a transportation period and/or a day of a week, for example, a high unit price may be set for holidays and midnight.

In addition to information defining a cost of a vehicle as shown in FIG. 7, the cost information 116 may include, although not shown, information defining a site fixed cost when a site such as a logistics site is used and information defining a site variable cost added corresponding to work time of a delivery work, a pickup work, and a delivery and pickup work at a logistics site and a quantity of goods to be delivered or picked-up.

FIG. 8 is a flowchart showing an example of a transportation planning processing. The transportation planning processing is started, for example, when the input reception unit 131 receives an instruction to execute the transportation planning processing from a user via a predetermined menu screen displayed on the output device 160.

First, in step S100, the transportation work order plan generation unit 133 reads information stored in the auxiliary storage device 110. Specifically, the transportation work order plan generation unit 133 reads and acquires the vehicle information 111, the site information 112, the transportation quantity information 113, the work time information 114, the travel time information 115, and the cost information 116 from the auxiliary storage device 110. Here, the transportation work order plan generation unit 133 may display a confirmation screen of input information using the acquired information on the output device 160.

FIG. 9 shows an example of a display screen displaying input information. A display screen 400 includes a site information display area 411, a work time information display area 412, a transportation quantity information display area 413, and the like. The site information display area 411 displays information showing a location of each site stored in the site information 112. The location of each site is displayed on a map in the example shown in FIG. 9. The work time information display area 412 displays work time for each work content stored in the work time information 114. The transportation quantity information display area 413 displays information of a purchase order stored in the transportation quantity information 113.

The display information in each display area may not be displayed in a table format as in the example shown in FIG. 9. For example, another visualization method such as a Gantt chart may be used to show an available pickup period or a deliverable period. The display screen 400 is not limited to display the information shown in FIG. 9, and may display other information stored in the auxiliary storage device 110.

For example, a data input button 401 and an optimum transportation plan (having a minimum cost) display button 402 are displayed on the display screen 400. When the input reception unit 131 receives a selection of the data input button 401, the output processing unit 132 separately displays the information read instep S100. Then, the input reception unit 131 receives an update of the displayed information from the user. When the input reception unit 131 receives a selection of the optimum transportation plan (having a minimum cost) display button 402, a processing in step S200 in the transportation planning processing is executed.

Return to FIG. 8. In step S200, the transportation work order plan generation unit 133 generates transportation work order plans of all patterns including an arrival order to each site for each vehicle and a delivery quantity and a pickup quantity at the site.

FIG. 10 is a flowchart showing an example of a processing of generating the transportation work order plans of all patterns in step S200. The minimum number of vehicles used in a transportation work is 1 (a case in which transportation works for all purchase orders shown in the transportation quantity information 113 are performed by the same single vehicle). The maximum number of vehicles is equal to the number of purchase orders in the transportation quantity information 113 (that is, a case in which transportation works for the purchase orders in the transportation quantity information 113 are all performed by different vehicles).

Therefore, processings in steps S201 to S205 are sequentially performed for a case in which the number of used vehicles is 1, a case in which the number of used vehicles is 2 . . . a case in which the number of used vehicles is the number of purchase orders. However, when the number of vehicles shown in the vehicle information 111 is smaller than the number of purchase orders, since the maximum number of vehicles is the number of vehicles shown in the vehicle information 111, it is not necessary to perform the processings in steps S201 to S205 for a pattern exceeding the number of vehicles shown in the vehicle information 111. Hereinafter, an example of a case in which N vehicles are used will be described.

In step S201, the transportation work order plan generation unit 133 generates all combinations of the N used vehicles with reference to the vehicle information 111. Specifically, for example, when three vehicles including vehicle 1 to vehicle 3 are registered in the vehicle information 111 as shown in FIG. 2 and N=2, all combinations of used vehicles include 3 combinations, that is, vehicle 1 and vehicle 2, vehicle 1 and vehicle 3, vehicle 2 and vehicle 3.

However, among the generated combinations of used vehicles, processings subsequent to step S202 are not performed for a combination not including a vehicle type specified in the vehicle type column 113g of the transportation quantity information 113.

Specifically, for example, a vehicle type of "refrigerating" is specified by a purchase order whose purchase order ID is 1 and a vehicle type of "refrigerating or room temperature" is specified by a purchase order whose purchase order ID is 2 and a purchase order whose purchase order ID is 3 in the vehicle type column 113g of the transportation quantity information 113 shown in FIG. 4. For example, since vehicle types of both the vehicle 2 and the vehicle 3 are "room temperature", the combination of vehicle 2 and vehicle 3 cannot perform a transportation work for the purchase order whose purchase order ID is 2 and the purchase order whose purchase order ID is 3. Therefore, the processings in steps S202 to S205 are not performed for this combination. The subsequent processings in steps S202 to S205 are sequentially performed for each combination of used vehicles generated in step S201.

In step S202, the transportation work order plan generation unit 133 allocates a purchase order that is a transportation target to each vehicle based on the transportation quantity information 113. Specifically, for example, when the used vehicle is at least one of the vehicle 1 and the vehicle 2 and a purchase order includes an order 1 and an order 2, all allocation combinations of the purchase order include 4 combinations, that is, (1) allocate both the order 1 and the order 2 to the vehicle 1, (2) allocate both the order 1 and the order 2 to the vehicle 2, (3) allocate the order 1 to the vehicle 1 and the order 2 to the vehicle 2, and (4) allocate the order 2 to the vehicle 1 and the order 1 to the vehicle 2.

However, in a purchase order in which a transportable vehicle type is specified in the transportation quantity information 113, the transportation work order plan generation unit 133 can allocate the purchase order to the specified vehicle type only. The subsequent processings in steps S203 to S205 are performed for each allocation combination of purchase orders generated in step S202.

In step S203, the transportation work order plan generation unit 133 generates, for each vehicle, all combinations of performing order plans of a delivery work and a pickup work in an allocated purchase order. The transportation work order plan generation unit 133 generates a performing order plan so that a delivery work is performed after a pickup work in the same purchase order.

Specifically, for example, when purchase orders including the order 1 and the order 2 are allocated to the vehicle 1, all combinations of performing order plans of the vehicle 1 are 6 combinations including (1) order 1, pickup→order 1, delivery→order 2, pickup→order 2, delivery, (2) order 1, pickup→order 2, pickup→order 1, delivery→order 2, delivery, (3) order 1, pickup→order 2, pickup→order 2, delivery→order 1, delivery, (4) order 2, pickup→order 2, delivery→order 1, pickup→order 1, delivery, (5) order 2, pickup→order 1, pickup→order 2, delivery→order 1, delivery, and (6) order 2, pickup→order 1, pickup→order 1, delivery→order 2, delivery.

In step S204, the transportation work order plan generation unit 133 generates and registers a transportation work order plan including an order of arrival to each site, and a delivery quantity and a pickup quantity at each site based on the performing order plan generated in step S203 and a transportation quantity of each purchase order shown in the transportation quantity information 113.

Specifically, for example, when the order 1 is to transport 30 pallets from a logistics center A to a store 1, and the order 2 is to transport 5 pallets from the store 1 to a customer 2, a transportation work order plan including the following transportation work orders is generated for the performing order plan (1) described above.

Transportation work order 1: a delivery quantity is zero and a pickup quantity is 30 pallets (order 1) at the logistics center A.

Transportation work order 2: a delivery quantity is 30 pallets (order 1) and a pickup quantity is 5 pallets (order 2) at the store 1.

Transportation work order 3: a delivery quantity is 5 pallets (order 2) and a pickup quantity is zero at the customer 2.

Here, a transportation work in the transportation work order 2 includes both delivery and pickup since the order 1, delivery and the order 2, pickup are continuous at the same site, that is, at the store 1. That is, in a case where a pickup work and a delivery work are continuous at the same site in a performing order plan, the continuous pickup and delivery work are combined as one transportation work when a transportation work order plan is generated. When a plurality of pickup works or delivery works are combined as one transportation work, the plurality of pickup works or delivery works are regarded as the same transportation work regardless of an order of the pickup works or the delivery works. Therefore, transportation work order plans corresponding to, for example, the performing order plan (1) and the performing order plan (2), are the same.

In step S205, the transportation work order plan generation unit 133 calculates a load quantity of a vehicle after a work in each transportation work order based on information about the delivery quantity and the pickup quantity generated in step S204. When all calculated load quantities are equal to or less than a load quantity upper limit of each vehicle shown in the vehicle information 111, the transportation work order plan generation unit 133 registers the transportation work order plan.

For example, when a load quantity upper limit of the vehicle 1 is 30 pallets, a load quantity is 30 pallets at a time point when the transportation work order 1 is completed, a load quantity is 5 pallets at a time point when the transportation work order 2 is completed and a load quantity is zero at a time point when the transportation work order 3 is completed. Since load quantities at all time points are equal to or less than the load quantity upper limit, the transportation work order plan can be registered. When one transportation work includes a delivery work and a pickup work, the delivery work is performed first. On the other hand, when the transportation work order plan generation unit 133 determines, for example, a vehicle whose load quantity exceeds a load quantity upper limit, the transportation work order plan generation unit 133 discards the transportation work order plan.

As shown in FIG. 10, the transportation work order plan generation unit 133 generates all combinations of transportation work order plans. In the processings in step S201 to step S203 described above, all combinations can be obtained by advancing a calculation from a top record to a bottom record of a vehicle or a purchase order provided in the vehicle information 111, the transportation quantity information 113, or the like. Alternatively, the above-described calculation may be executed using a known recursive calculation algorithm or the like.

Return to FIG. 8. The processings in step S300, step S400, step S500, and step S700 are sequentially executed for each combination of the transportation work order plans generated in step S200.

In step S300 subsequent to step S200, the work content specifying unit 134 specifies a work content for each transportation work included in a transportation work order plan. Specifically, the work content specifying unit 134 specifies a transportation work in which there is a delivery quantity but no pickup quantity as a delivery work, a transportation work in which there is a pickup quantity but no delivery quantity as a pickup work, and a transportation work in which there are both a delivery quantity and a pickup quantity as a delivery and pickup work.

In the transportation work order plan including the transportation work orders 1 to 3 described above, for example, a transportation work in the transportation work order 1 is a pickup work since there is a pickup quantity but no delivery quantity. A transportation work in the transportation work order 2 is a delivery and pickup work since there are both a delivery quantity and a pickup quantity. A transportation work in the transportation work order 3 is a delivery work since there is a delivery quantity but no pickup quantity.

In step S400, the work time specifying unit 135 specifies work time required for each transportation work. Specifically, the work time specifying unit 135 specifies, for each vehicle in a transportation work order plan, work time according to a combination of a type of the vehicle, a site name of a transportation work allocated to the vehicle, and a work content of the transportation work specified in step S300 with reference to the work time information 114.

For example, a site of the transportation work in the transportation work order 1 described above is the logistics center A and a work content of the transportation work is a pickup work. A type of a target vehicle of the transportation work is refrigerating. At this time, work time is 8 minutes in the work time information 114 in the example shown in FIG. 5. Work time for all transportation works in the transportation work order plan is specified in this manner.

In step S500, the transportation plan creating unit 136 creates a transportation plan (step S500) based on a transportation work order plan, the work time specified in step S400, and a constraint condition. Examples of a constraint condition include the operable period shown in the vehicle information 111, the available pickup period and the deliverable period shown in the transportation quantity information 113, and the travel time shown in the travel time information 115.

For example, the order 1 in the transportation work order plan described above is an order whose purchase order ID is 1 and the order 2 is an order whose purchase order ID is 2 in the transportation quantity information 113 shown in FIG. 4. In this case, when numerical value examples in the work time information 114 shown in FIG. 5 and the travel time information 115 shown in FIG. 6 are used, the transportation plan creating unit 136 sequentially adds the work time and the travel time to the available pickup period of the order 1 of the transportation work order 1 from a starting time point of 8:00 of the available pickup period, and adjusts a starting time point of a pickup work and a delivery work so as to satisfy the constraint condition. Specifically, a transportation plan satisfying the following constraint conditions is created.

(1) At the logistics center A, the pickup work (order 1) is performed from 8:00 and work time is 8 minutes.

(2) Depart from the logistics center A at 8:08 and arrive at the store 1 at 8:32 after 24-minute travel time.

(3) At the store 1, the delivery and pickup work (order 1 and order 2) is performed from 8:32 and work time is 40 minutes.

(4) Depart from the store 1 at 9:12 and arrive at the customer 2 at 9:30 after 18-minute travel time.

(5) At the customer 2, wait until a starting time point of a deliverable period.

(6) At the customer 2, the delivery work (order 2) is performed from 9:45 and work time is 5 minutes.

The example described above shows a method for creating a transportation plan by adding work time and travel time to an operable period of a first order starting from a starting time point of the operable period. The method for creating a transportation plan is not limited to the method described above. Alternatively, the transportation plan creating unit 136 may create a transportation plan that satisfies the above-described constraint conditions and optimizes a total cost which will be described later by a mathematical optimization method such as a mixed integer programming method. The transportation plan creating unit 136 may not use the travel time information 115 and calculate travel time based on a location of a site shown in the site information 112.

In the above-described transportation plan example, it is assumed that a vehicle has already been at a site where a work is to be performed at a starting time point of a first transportation work. Alternatively, an initial position of the vehicle may be at other sites (for example, at a parking lot). The vehicle may be moved to an end position after all transportation works are completed. In this case, a work plan includes a travel of the vehicle from the initial position to the site where the first transportation work is performed and a travel of the vehicle from a site where a final transportation work is performed to the end position.

In step S600, the transportation plan creating unit 136 determines whether the transportation plan satisfying the constraint conditions in step S500 can be created. When the transportation plan creating unit 136 determines that the transportation plan satisfying the constraint conditions can be created (S600: Yes), the processing proceeds to step S700. When the transportation plan creating unit 136 determines that the transportation plan satisfying the constraint conditions cannot be created (S600: No), a processing loop for the transportation work order plan is ended.

In step S700, the cost calculation unit 137 calculates a total cost for the transportation plan satisfying the constraint conditions created in step S500, and records the transportation plan and the calculated total cost.

Specifically, the cost calculation unit 137 calculates the total cost using the following formula (1) based on the fixed cost and the variable cost shown in the cost information 116, vehicles used in the created transportation plan, and operation time of each of the vehicles in the transportation plan.

Total cost=fixed cost of vehicle in transportation plan+variable cost of vehicle in transportation plan     (1)

Fixed cost of vehicle in transportation plan=Σ vehicle {usage flag of vehicle×fixed cost per unit period of vehicle×length of period}     (2)

Variable cost of vehicle in transportation plan=Σ vehicle {variable cost per unit period of vehicle×operation time}     (3)

The usage flag of a vehicle is a variable which is 1 when the vehicle is used and is 0 when the vehicle is not used.

For example, when operation time per month of the vehicle 1 and the vehicle 2 indicated by numerical value examples in the cost information 116 shown in FIG. 7 is respectively 100 hours and 90 hours, a total cost per month can be calculated as follows.

Fixed cost of vehicle 1 [$] = 30,000[$/month] × 1[month] = 30,000 [$]

Fixed cost of vehicle 2 [$] = 40,000[$/month] × 1 = 40,000 [$]

Variable cost of vehicle 1 [$] = 5 [$/hour] × 100 [hour] = 500 [$]

Variable cost of vehicle 2 [$] = 6 [$/hour] × 90 [hour] = 540 [$]

Total cost [$] =
(30,000 [$] + 40,000 [$]) + (500 [$] + 540 [$]) = 71,040 [$]

In the above-described example, the total cost is defined by a sum of the fixed costs of the vehicles and the variable costs of the vehicles. Alternatively, as described in the description of the cost information 116, the total cost may be defined by a sum obtained by further adding other cost items such as a site fixed cost and a site variable cost, or may be defined by a sum of only one of the fixed cost and the variable cost.

Since the longer the work time, the higher the above-described cost, the total cost not only reflects a money cost but also a time cost. Alternatively, the total cost may only reflect the time cost (for example, the total cost is calculated by a decreasing function of the work time).

In step S800, the optimum transportation plan selection unit 138 selects and displays a transportation plan having a minimum cost via the output processing unit 132. Specifically, the optimum transportation plan selection unit 138 specifies a transportation plan having a minimum total cost from transportation plans recorded in the processing in step S700, and displays information about the specified transportation plan on the output device 160 via the output processing unit 132.

FIG. 11 shows an example of a display screen showing the transportation plan having a minimum cost that is specified in step S800. A display screen 500 includes a total cost display area 501, a vehicle number display area 502, an optimum transportation plan display area 503, a vehicle detail display area 504, an instruction reception button display area 505, and the like.

The total cost display area 501 displays a calculated total cost, details thereof, and the like. Specifically, the total cost display area 501 displays, for example, a total cost of the transportation plan specified in step S800, that is, the minimum total cost, and a vehicle fixed cost and a vehicle variable cost which are details of the total cost. The total cost may be displayed per unit period, or may be displayed as an actual cost in a work period of a transportation plan.

The vehicle number display area 502 displays, for example, the total number of vehicles required for the transportation plan specified in step S800, that is, the transportation plan having a minimum total cost. Not only the number of vehicles but also information (such as a vehicle name, a load quantity upper limit, and a vehicle type) shown in the vehicle information 111 of a vehicle used in the transportation plan may be displayed in the vehicle number display area 502.

The optimum transportation plan display area 503 displays, for example, information about the transportation plan specified in step S800, that is, the transportation plan having a minimum total cost. Specifically, the optimum transportation plan display area 503 displays, for example, information of a transportation work order of each vehicle in the transportation plan, such as a name of a site where a work is performed, a work content, a delivery quantity and a pickup quantity, a work starting date and time, and a work ending date and time.

The vehicle detail display area 504 displays, for example, detailed information of a specific vehicle used in the transportation plan specified in step S800, that is, the transportation plan having a minimum cost. Specifically, when a specific vehicle is selected using a pull-down vehicle selection button 506 or the like, the output processing unit 132 displays detailed information of the selected vehicle.

The detailed information of the vehicle includes a Gantt chart 507 in which vehicle states such as working, traveling and waiting in the transportation plan are color coded in a legend and the vehicle state during each period is displayed in a graph, transportation route information 508 that displays work sites and travel routes in the transportation plan on a map, and the like. Alternatively, each work content such as a delivery work, a pickup work, and a delivery and pickup work may be color coded in the Gantt chart 507.

The vehicle detail display area 504 may display detailed information of a plurality of vehicles used in the transportation plan may be displayed, or detailed information of all vehicles used in the transportation plan.

The instruction reception button display area 505 displays a button for receiving an instruction input from the user. Specifically, the instruction reception button display area 505 displays, for example, a button for receiving a display instruction of another transportation plan (and a total cost) and an end button.

For example, when the button for receiving a display instruction of another transportation plan (and a total cost) is pressed, the optimum transportation plan selection unit 138 selects a transportation plan having a small total cost subsequent to a currently displayed transportation plan, and displays information of the selected transportation plan on the output device 160 via the output processing unit 132.

The output processing unit 132 may not only display the transportation plan having a minimum total cost, but also display information about another transportation plan and cost that have been calculated, information about an actual transportation plan, or the like. Alternatively, the output processing unit 132 may compare the above information with the information of the transportation plan having a minimum cost.

When the output processing unit 132 receives a display instruction of another transportation plan, the output processing unit 132 may display information of a predetermined number (for example, three) of transportation plans in ascending order of total costs or information of all transportation plans whose total costs are equal to or less than a predetermined value, or may display information of a transportation plan selected by the user from a list.

In addition, the output processing unit 132 may output the transportation plan (including at least a part relating to a transportation work performed by a vehicle) selected by the user to each vehicle included in the transportation plan, so that a driver of each vehicle may refer to the transportation plan or each site such as a store may be notified of an estimated arrival time point.

The transportation planning apparatus 100 according to the present embodiment can create an executable and efficient transportation plan by classifying work contents at each site into (1) a delivery work, (2) a pickup work, and (3) a delivery and pickup work and appropriately determining work time without using a simple linear sum of delivery work time and pickup work time.

Second Embodiment

In the transportation planning apparatus 100 according to the present embodiment, work time is changed corresponding to a load quantity of goods on a vehicle at a site at a work time point. The work time specifying unit 135 calculates a load quantity of a vehicle at each site at a work time point based on a generated transportation work order plan, and specifies work time based on the calculated load quantity. Hereinafter, differences from the first embodiment will be described.

FIG. 12 shows an example of a graph showing a relationship between a load ratio and work time of a vehicle for each work content. Generally, as a load ratio of a vehicle which is a ratio of a load quantity of the vehicle to a load quantity upper limit of the vehicle increases, a work space in a vehicle storage is reduced, work efficiency decreases, and work time required for each of (1) a delivery work, (2) a pickup work, and (3) a delivery and pickup work increases.

In particular, in a work involving pickup such as (2) a pickup work and (3) a delivery and pickup work, time required for ensuring a space to store picked-up goods in the vehicle storage or for a transshipment work of arranging delivery goods to a next store nearby while storing picked-up goods rapidly increases corresponding to the load ratio of the vehicle.

As shown in FIG. 12, a large-small relationship between work time of (4) a delivery work and a pickup work that indicates a linear sum of work time of the delivery work and work time of the pickup work by a dotted line and work time of (3) delivery and pickup is different before and after (5) a branch point in the load ratio of the vehicle or the like. The work time of (4) corresponds to work time when the delivery work and the pickup work are performed separately.

Therefore, when the load ratio of the vehicle is smaller than (5) the branch point, the work time of (3) delivery and pickup work is short and work efficiency is high compared with the work time when (4) the delivery work and the pickup work are performed separately since only one round travel between the vehicle and the site is enough and work efficiency in the vehicle storage is high.

In contrast, when the load ratio of the vehicle is larger than (5) the branch point, the work time of (3) delivery and pickup work is longer than the work time of (4) since work efficiency in the vehicle storage is low. Therefore, work efficiency when (4) the delivery work and the pickup work are performed separately is higher than that of (3) the delivery and pickup work.

Therefore, a transportation plan can be created more precisely by defining that work time of each work changes corresponding to a load ratio of a vehicle. Then, a more efficient transportation plan can be created to mainly perform (1) a delivery work when the load ratio is high and then perform (3) a delivery and pickup work or (2) a pickup work when a vehicle storage has an available space after delivery and the load ratio decreases. The matter that the work time may change corresponding to the load ratio refers that the work time may change corresponding to a load quantity as long as at least a load quantity upper limit of a vehicle is not changed.

FIG. 13 shows an example of the work time information 114 according to the present embodiment. The work time information 114 shows, for each site and each vehicle type, work time corresponding to a load quantity of a vehicle for (1) a delivery work, (2) a pickup work, and (3) a delivery and pickup work, respectively. Specifically, for example, the work time information 114 includes a site name column 114a, a vehicle type column 114b, and a work time column 114e.

The work time column 114e is work time required for each of (1) a delivery work, (2) a pickup work, and (3) a delivery and pickup work, and holds information of work time that may change corresponding to a load quantity of a vehicle at a time point when a work is performed. The work time column 114e may further hold information showing a linear sum of work time corresponding to a load quantity of a vehicle at time points when (1) a delivery work and (2) a pickup work are performed. The work time defined in the work time column 114e may change corresponding to a load ratio of a vehicle which is a ratio of a load quantity of the vehicle to the load quantity upper limit column 111b of the vehicle.

The work time of each work content shown in the work time column 114e is expressed by a function using a load ratio of a vehicle as a variable. For example, the work time may be set for each section of the load ratio of the vehicle by a multinomial using the load ratio of the vehicle as a variable as shown in a graph 114f. Alternatively, the work time may be set in a stepwise manner for each section of the load ratio of the vehicle as shown in a graph 114g.

FIG. 14 is a flowchart showing a detailed example of a work time specifying processing in step S400 according to the present embodiment. The work time specifying unit 135 sequentially performs the following processings in steps S401 to S403 for each vehicle used in a target transportation work order plan. In step S401, the work time specifying unit 135 initializes a load quantity of a target vehicle. Although an initial value is zero in the following description, the initial value does not necessarily have to be zero.

The work time specifying unit 135 sequentially performs the following processings in S402 to S403 from a first transportation work order to a final transportation work order in the target transportation work order plan for all transportation works in the target transportation work order plan.

In step S402, the work time specifying unit 135 specifies work time of a target transportation work shown in the work time information 114 based on a load quantity of a target vehicle, a type of the target vehicle, and a site where the transportation work is performed.

For example, it is assumed that the target transportation work is the transportation work in the first transportation work order 1, the type of the target vehicle is refrigerating, and the load quantity at this time is zero. A site of the transportation work in the transportation work order 1 is the logistics center A and a work content of the transportation work in the transportation work order 1 is specified as a pickup work in step S300. A pickup quantity is 30 pallets.

When the vehicle type is refrigerating, work time of the pickup work at the logistics center A is defined by, for example, the graph 114f in the work time information 114 shown in FIG. 14. In this case, since the work time is defined with respect to a load ratio of a vehicle, the work time specifying unit 135 calculates a load ratio from a load quantity based on the following formula (4) or the like in order to calculate the work time.

$$\text{Vehicle load ratio [\%]} = \text{vehicle load quantity} \div \text{vehicle load quantity upper limit} \quad (4)$$

Since the load quantity of the vehicle at this time point is zero, the load ratio of the vehicle is calculated to be zero [%] from the formula (4). The load ratio of the vehicle may be a value at a starting time point of a work (a delivery work, a pickup work, or a delivery and pickup work) shown in the work content, a value at an ending time point of the work shown in the work content, a value at a time point of arriving at a site, or a value at a time point of departing from a site.

In the graph 114f, when the load ratio of the vehicle is zero [%], the work time of the pickup work is 5 minutes. In this case, the work time specifying unit 135 can specify that the work time of the pickup work at this time point is 5 minutes.

In step S403, the work time specifying unit 135 updates the load quantity of the target vehicle based on a delivery quantity and/or a pickup quantity of the target transportation work. Specifically, the work time specifying unit 135 updates the load quantity of the vehicle based on the following formula (5).

$$\text{Load quantity} \leftarrow \text{load quantity} + \text{pickup quantity} - \text{delivery quantity} \quad (5)$$

Here, ← in the formula (5) represents substitution. For example, a load quantity after update is 30 pallets in the example described above since the load quantity at the time of performing the work is zero, the pickup quantity of the transportation work in the transportation work order 1 is 30 pallets, and the delivery quantity is zero.

Similarly, work time can be specified for all transportation works included in a transportation work order plan. Similar to the first embodiment, the processing proceeds to step S500 when the work time specifying unit 135 completes all processings shown in FIG. 14.

In the transportation planning apparatus 100 according to the present embodiment, work time of each transportation work is defined to change corresponding to a load quantity of a vehicle. Accordingly, the transportation planning apparatus 100 according to the present embodiment can more precisely estimate work time in a transportation plan.

The transportation planning apparatus 100 according to the present embodiment can create a more efficient transportation plan that mainly performs, for example, (1) a delivery work when a load ratio is high, and then performs (3) a delivery and pickup work or (2) a pickup work when a vehicle storage has an available space after delivery and the load ratio decreases.

The present embodiment describes an example in which all combinations of transportation plans are generated. Alternatively, a combination of transportation plans having a minimum total cost may be calculated by a mathematical optimization method such as a mixed integer programming method.

The invention is not limited to the embodiments described above and includes various modifications. For example, the embodiments described above have been described in detail for easy understanding of the invention, and the invention is not necessarily limited to those including all of the configurations described above. A part of a configuration of one embodiment can be replaced with a configuration of another embodiment, and the configuration of another embodiment can be added to the configuration of the one embodiment. In addition, a part of the configuration of one embodiment may be added, deleted, or replaced with another configuration.

A part or all of the configurations, functions, processing units, processing methods or the like described above may be implemented by hardware such as through design using an integrated circuit. Alternatively, the configurations, functions, and the like described above may be implemented by software by means of a processor interpreting and executing a program for implementing respective functions. Information such as a program, a table, or a file for implementing each function can be placed in a recording device such as a memory, a hard disk, and a solid state drive (SSD), or a recording medium such as an IC card, an SD card, and a DVD.

Control lines and information lines indicate what is considered necessary for description, and not all of the control lines and information lines in a product are necessarily shown. Almost all the configurations may be considered actually in connection with each other.

REFERENCE SIGN LIST 100 transportation planning apparatus
110 auxiliary storage device
111 vehicle information
112 site information
113 transportation quantity information
114 work time information
115 travel time information
116 cost information
120 memory
130 processor
133 transportation work order plan generation unit
134 work content specifying unit
135 work time specifying unit
136 transportation plan creating unit
137 cost calculation unit
138 optimum transportation plan selection unit
140 communication device
150 input device
160 output device

The invention claimed is:

1. A transportation planning apparatus comprising:
a processor;
a memory; and
a communication device coupled to the processor that is configured to communicate with each of a plurality of vehicles, pickup sites and delivery sites,
wherein the memory is configured to store:
order information indicating a plurality of orders, each order including a quantity of goods, a delivery site, a pickup site, a delivery time period, a pickup time period, and a vehicle type required to complete the respective order,
work time information that shows, for each delivery site and each pickup site, a work time amount required to complete the delivery or pickup at the respective delivery site or pickup site
vehicle information showing available vehicles, and
cost information showing a cost per unit time of operating each of the vehicles, and
wherein the processor is configured to:
generate a plurality of transportation work order plans each showing a performance order of the delivery and the pickup included in each of the plurality of orders,
determine successive orders such that a delivery site of one order is a pickup site of another order or a pickup site of one order is a delivery site of another order in each of the one or more transportation work order plans,
specify respective work time times for each of the orders in each of the one or more transportation work order plans based on the work time information,
include the specified work time in work time of each of the transportation work order plans,
allocate the vehicles shown in the vehicle information to each of the plurality of orders when the one or more transportation work order plans are generated,
calculate a cost for each of the one or more transportation work order plans based on the work time of each of the one or more transportation work order plans and based on the cost information,
select a transportation plan from the one or more transportation work order plans based on the calculated cost, and
instruct the communication device to send the selected transportation plan to the vehicle and each of the delivery site and the pickup site in the selected transportation plan, and
wherein each of the vehicles perform the delivery and pickup of the goods of the orders of according to each respective selected transportation plan.

2. The transportation planning apparatus according to claim 1, wherein
for a delivery and a pickup that are included in the same order when the one or more transportation work order plans are generated, the processor determines the performance order so that the delivery is performed after the pickup.

3. The transportation planning apparatus according to claim 1, wherein
the memory stores vehicle information showing available vehicles and respective types of the vehicles,
wherein the order information indicates the types of the vehicles available to perform each of the plurality of orders, and
the processor is configured to allocate, to each of the plurality of orders, a vehicle whose type is available to perform the corresponding orders based on the transportation vehicle information when the one or more transportation work order plans are generated.

4. The transportation planning apparatus according to claim 1, wherein
the memory stores vehicle information showing an available vehicle,
the work time changes corresponding to a load quantity of the vehicle at the time of performing a an order, and
wherein the processor is configured to:
allocate a vehicle to each of the plurality of orders based on the vehicle information when the one or more transportation work order plans are generated,
calculate a load quantity of a vehicle allocated to a corresponding order at the time of separately performing each of the one or more transportation work order plans based on the quantity of the goods of the order information, and
specify a work time of the each of the one or more transportation work order plans based on the calculated load quantity and based on the work time information.

5. The transportation planning apparatus according to claim 1, wherein
the memory stores vehicle information showing an available vehicle and an available period of the vehicle, and wherein the processor is configured to specify, when the one or more transportation work order plans are generated, a starting time point of each order in a corresponding transportation work order plan so as to use the vehicle to perform the delivery work and the pickup work that are included in each of the plurality of orders during the available period of the vehicle, the available period being the executable period of the delivery included in each of the plurality of orders and the executable period of the pickup included in each of the plurality of orders based on the order information and the vehicle information.

6. The transportation planning apparatus according to claim 5, wherein
the memory stores travel time information showing travel time between sites, and
wherein the processor is configured to:
specify travel time between different sites with reference to the work time information when two successive orders included in each of the one or more transportation work order plans are performed at the different sites, and
determine a starting time point of each order in each of the transportation work order plans based on the travel time when the one or more transportation work order plans are generated.

7. A transportation planning system comprising:
a transportation planning apparatus comprising a communication device coupled to the processor that is configured to communicate with each of a plurality of vehicles, pickup sites and delivery sites; and
a server,
wherein the server is configured to store:
order information indicating a plurality of orders, each order including a quantity of goods, a delivery site, a pickup site, a delivery time period, a pickup time period, and a vehicle type required to complete the respective order,
work time information that shows, for each delivery site and each pickup site, a work time amount required to complete the delivery or pickup at the respective delivery site or pickup site,
vehicle information showing available vehicles, and
cost information showing a cost per unit time of operating each of the vehicles, and
wherein the transportation planning apparatus is configured to:
generate a plurality of transportation work order plans each showing a performance order of the delivery and the pickup included in each of the plurality of orders,
determine successive orders such that a delivery site of one order is a pickup site of another order or a pickup site of one order is a delivery site of another order in each of the one or more transportation work order plans,
specify respective work times for each of the orders in each of the one or more transportation work order plans based on the work time information,
include the specified work time in work time of each of the transportation work order plans,
allocate the vehicles shown in the vehicle information to each of the plurality of orders when the one or more transportation work order plans are generated,
calculate a cost for each of the one or more transportation work order plans based on the work time of each of the one or more transportation work order plans and based on the cost information,
select a transportation plan from the one or more transportation work order plans based on the calculated cost, and
instruct the communication device to send the selected transportation plan to the vehicle and each of the delivery site and the pickup site in the selected transportation plan, and
wherein each of the vehicles perform the delivery and pickup of the goods of the orders of according to each respective selected transportation plan.

8. A method for creating a transportation plan by a transportation planning apparatus, the transportation planning apparatus comprising: a processor; a memory; and a communication device coupled to the processor that is configured to communicate with each of a plurality of vehicles, pickup sites and delivery sites,
wherein the memory is configured to store: order information indicating a plurality of orders, each order including a quantity of goods, a delivery site, a pickup site, a delivery time period, a pickup time period, and a vehicle type required to complete the respective order, work time information that shows, for each delivery site and each pickup site, a work time amount required to complete the delivery or pickup at the respective delivery site or pickup site, vehicle information showing available vehicles, and cost information showing a cost per unit time of operating each of the vehicles, the method, executed by the processor, comprising:
generating a plurality of transportation work order plans each showing a performance order of the delivery and the pickup included in each of the plurality of orders,
determining successive orders such that a delivery site of one order is a pickup site of another order or a pickup site of one order is a delivery site of another order in each of the one or more transportation work order plans,
specifying respective work times for each of the orders in each of the one or more transportation work order plans based on the work time information,
including the specified work time in work time of each of the transportation work order plans,
allocating the vehicles shown in the vehicle information to each of the plurality of orders when the one or more transportation work order plans are generated,
calculating a cost for each of the one or more transportation work order plans based on the work time of each of the one or more transportation work order plans and based on the cost information,
selecting a transportation plan from the one or more transportation work order plans based on the calculated cost, and
instructing the communication device to send the selected transportation plan to the vehicle and each of the delivery site and the pickup site in the selected transportation plan,
wherein each of the vehicles perform the delivery and pickup of the goods of the orders of according to each respective selected transportation plan.

* * * * *